Patented Aug. 30, 1932

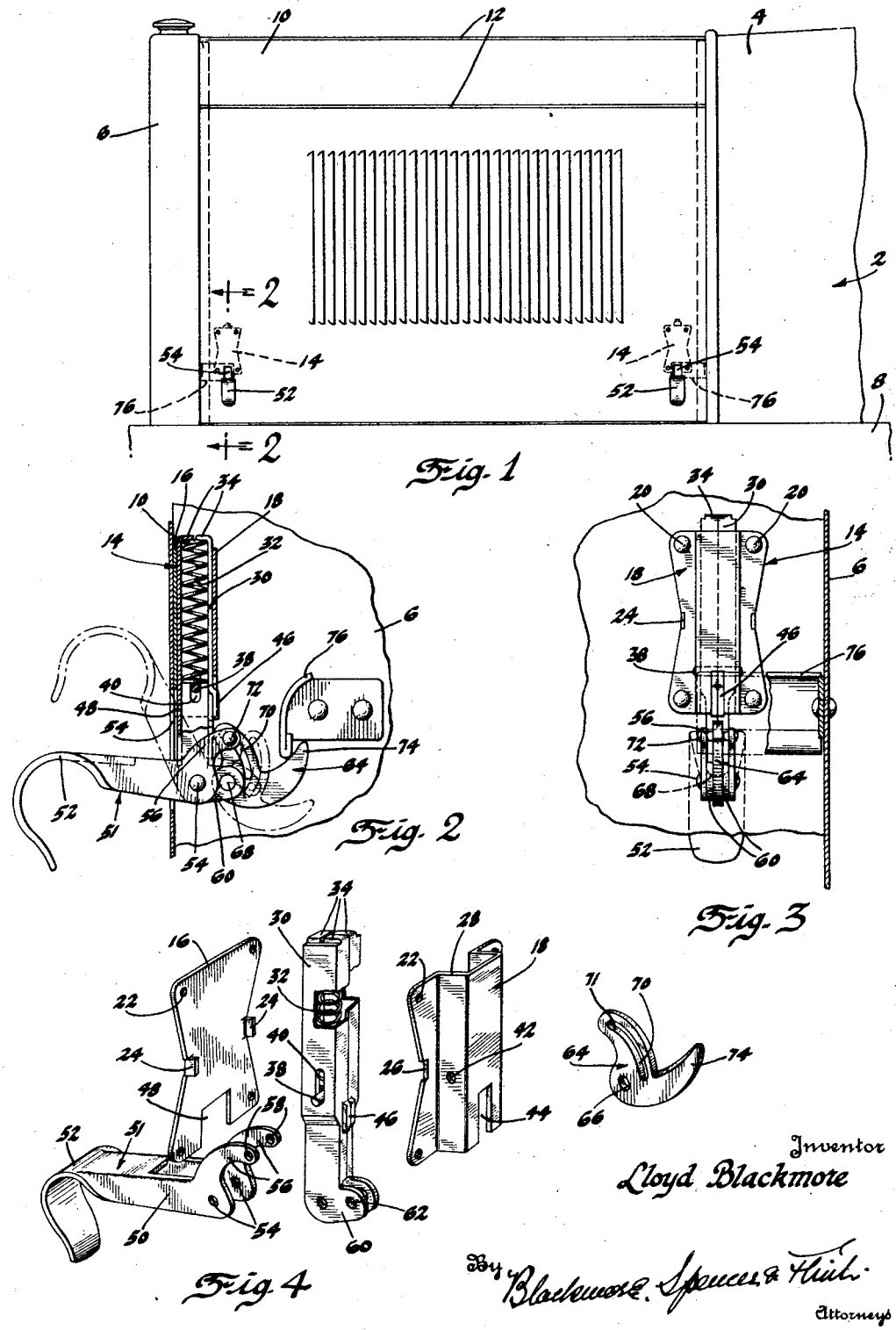

1,874,230

UNITED STATES PATENT OFFICE

LLOYD BLACKMORE, OF DETROIT, MICHIGAN, ASSIGNOR TO TERNSTEDT MANUFACTURING COMPANY, OF DETROIT, MICHIGAN, A CORPORATION OF MICHIGAN

HOOD LATCH

Application filed September 8, 1931. Serial No. 561,603.

This invention relates to improvements in latches for holding down the hoods of automotive vehicles.

The improvements consist in slidably mounting on the inside of the hood a mounting member to which there is pivoted an operating member, the handle portion of which extends outside the hood. A hook pivoted to the mounting member inside the hood is connected to the operating handle by means of a pin and slot connection, the hook engaging under a holding member secured to either the dashboard or the radiator shell. The movement of the handle moves the hook into or out of engagement with the member. A spring housed in the mounting member resiliently retains the parts in position and prevents rattle.

On the drawing:

Figure 1 is a side view of the hood of an automotive vehicle showing the invention applied.

Figure 2 is a section on the line 2—2 of Figure 1.

Figure 3 is an elevation of the latch from inside the hood.

Figure 4 is an expanded view of the latch parts.

Referring to the drawing, the numeral 2 indicates an automotive vehicle having a cowl 4, a radiator shell 6, a chassis 8 and a hood 10. The hood has the hinges at 12 to enable it to be raised and lowered. The hood has the hood catches 14 at the lower sides thereof adjacent the cowl and the radiator shell. The particular novelty of the invention resides in the hood catches 14.

The hood catches 14 are mounted inside the hood by means of a mounting plate 16 and a retaining plate 18, both of which are secured to the hood by means of rivets 20 passing through openings 22 in the plates 16 and 18. The plate 16 has the integral tongues 24 which fit into notches 26 on the retaining plate 18 to aid in positioning the parts. The plate 18 has the rectangularly formed portion 28 in which there is adapted to slide the mounting member 30. The mounting member 30 is formed of a single piece of metal bent into rectangular shape and slidable in the rectangularly shaped portion 28. The mounting member 30 is hollow and has housed therein the coil spring 32 which is held therein by means of the bent-over lugs 34 at the upper end and the pin 38 at the lower end. The pin 38 is slidable in slots 40 in the sides of the mounting member 30. The retaining plate 18 has the openings 42 in its sides for the reception of the ends of the pin 38. The spring 32 at all times urges the mounting member 30 upwardly in the mounting plate 18. The retaining plate 18 has a slot 44 therein in which there rides the projection 46 pressed from the mounting member 30.

The plate 16 has a recess 48 formed at the lower portion thereof in which there is received the shank 50 of an operating member 51 having the handle 52. The handle 52 extends through an opening 54 in the hood and projects outwardly thereof as shown in Figure 2. The handle is forked and pivoted at 54 to the lower portion of the mounting member 30, the fork straddling the member 30. The operating member 51 has the tines or goose-neck extensions 56 extending away from the pivot 54 inside the hood and provided with openings 58 at their ends.

The mounting member 30 has the foot 60 at its lower extremity provided with openings 62 at the toe portion thereof. A hook 64 has an opening 66 which mates with the opening 62 in the foot and receives a pivot pin 68. An arcuate slot 70 having a flat 71 at its upper extremity is provided in the hook 64 and a pin or roller 72 passes through the openings 58 in the extension 56 and is received in a slot 70. The slot 70 is not concentric with the pivot pin 68 but has a shape corresponding to the path of travel of the pin 72. If desired, a cam surface may be used instead of the slot as the pin 72 is always in contact with the slot side adjacent the hood. The hook portion 74 of the hook 64 is adapted to engage under the brackets or retaining members 76 secured to the radiator shell 6 and to the dashboard.

The operation of the device is as follows: The full line position of the parts is shown in Figure 2. In this position, the spring 32 resiliently urges the mounting member 30 upward and as the operating parts are attached thereto, the spring will prevent rattle and will resiliently retain the parts in position. The end of the hook 64 at the flat 71 will be against the wall of the member 30. Any tendency for the hood to raise will be resisted by the engagement of the flat 71 with the pin 72. The leverage is so arranged that for ordinary purposes, the hook member 64 will be unable to operate the handle to the dotted line position in Figure 2 principally because the pull exerted by the flat 71 against the pin 72 will be in line with the pivot 68. To raise the hood, the operator raises the handle 52 which will cause the pin 72 to move downward in the cam slot 70 toward the pivot 68 and swing the latch member 64 from the full line position in Figure 2 to the dotted line. The hood may now be raised. When the hood is lowered, the operator presses the handle from the dotted line position in Figure 2 to the full line position again to latch the hood.

I claim:

1. In a latch for the hoods of vehicles, a securing member permanently mounted on a stationary part of the vehicle, an operating member pivotally connected to the hood on the inside thereof, a handle on said operating member extending outside the hood, a hook pivoted to the hood on the inside thereof and interconnected with said operating member, said member and hook having independent pivots, said interconnection comprising a pin movable in a slot, the movement of said operating member moving the hook into or out of engagement with the securing member.

2. In a latch for the hoods of vehicles, a securing member permanently mounted on a stationary part of the vehicle, an operating member pivotally connected to the hood, a handle on said operating member extending outside the hood, a hook pivoted to the hood and interconnected with the operating member, said interconnection comprising a pin on the member and an arcuate slot on the hook, said arcuate slot being eccentric with the pivot of the hook, the movement of said operating member moving the hook into or out of engagement with the securing member.

3. In a latch for the hoods of vehicles, a securing member mounted on a stationary part of the vehicle, a slidable and resiliently mounted member, means on the inside of the hood for retaining said member, an operating member pivoted to said slidable member inside the hood, a handle on said operating member extending outside the hood, a hook pivoted to said slidable member and interconnected with said operating member, the movement of said operating member on its pivot actuating said hook to cause it to engage or disengage said securing member.

4. In a latch for the hoods of vehicles, a securing member mounted on a stationary part of the vehicle, a slidable and resiliently mounted member, means on the inside of the hood for retaining said member, an operating member pivoted to said slidable member inside the hood, a handle on said operating member extending outside the hood, a hook pivoted to said slidable member and interconnected with said operating member, said interconnection comprising a pin and slot, the movement of said operating member actuating said hook to cause it to engage or disengage said securing member.

5. In a latch for the hoods of vehicles, a securing member mounted on a stationary part of the vehicle, a slidable and resiliently mounted member, means on the inside of the hood for retaining said member, an operating member pivoted to said slidable member inside the hood, a handle on said operating member extending outside the hood, a hook pivoted to said slidable member and interconnected with said operating member, said interconnection comprising a pin on the operating member and an arcuate slot on the hook, said arcuate slot being eccentric with the pivot of the hook, the movement of said operating member actuating said hook to cause it to engage or disengage said securing member.

6. In a latch for the hoods of vehicles, a holding member secured to a stationary part of the vehicle, means movably mounted on the hood adjacent the member, an operating member and a hook independently pivoted to said means and interconnected with each other, said hook capable of engagement with said holding member to retain the hood in latched position, said hook operable from said operating member, said hook having a flat portion at its place of connection with said operating member, said connection including a pin to engage the flat portion to prevent disengagement of the hook from the holding member.

In testimony whereof I affix my signature.

LLOYD BLACKMORE.